3,556,811
LOW-FERMENTABILITY HARD CANDY
Walton J. Smith, 171 Sharp Hill Road,
Wilton, Conn. 06897
No Drawing. Continuation-in-part of application Ser. No. 652,425, July 11, 1967. This application Aug. 11, 1969, Ser. No. 849,136
Int. Cl. A23g 3/00
U.S. Cl. 99—134                    14 Claims

ABSTRACT OF THE DISCLOSURE

A carbohydrate-containing base for hard candy manufacture having a composition of low-fermentable ingredients, which is adaptable for processing in standard hard candy manufacturing facilities and, when incorporated with the usual flavoring, color and sweentening additives, effects a nutritious finished hard candy product which exhibits minimal tendency to ferment when ingested.

This application is a continuation-in-part of copending patent application Ser. No. 652,425, filed July 11, 1967 and now abandoned.

BACKGROUND OF THE INVENTION

This invention relates to the manufacture of hard candies and, more particularly, is directed to the manufacture of hard candies having a low content of fermentable carbohydrate ingredients.

In contrast to the dietetic candy products of the prior art in which formulations are employed to minimize the caloric value of the sweet products, the nutritious hard candies of the instant invention contain ingredients having a caloric intensity equivalent to that of sucrose, and, as such, are especially appealable and suitable for normal children requiring a convenient, appetizing source of energy.

Heretofore, attempts to formulate hard candies with carbohydrates other than sucrose and yet having a caloric value equivalent to the available hard candies containing major proportions of sucrose have not been commercially successful. The lack of commercial acceptance of substitute ingredients for sucrose has been primarily due to the extreme difficulty in processing these materials with existing commercial equipment employed for the manufacture of such commodities. The processing techniques and commercial equipment employed for the manufacture of hard candies have been developed, designed and adapted to the physical properties of sucrose, especially with respect to the viscosity, specific heats and solidification properties of aqueous solutions of sucrose admixed with corn syrup solids under a wide range of concentrations and temperatures. Particularly, the structural design of such equipment as pumps, cooking kettles, agitators, piping, and process control instrumentation has been especially developed specifically for the processing of concentrated aqueous solutions of sucrose admixed with corn syrup solids.

Prior to the conception of the instant invention, the manufacture of hard candies wherein the sucrose and corn syrup solids have been replaced with alternate ingredients has met, for the most part, with major processing difficulties and, therefore, has understandably lacked commercial success.

Although technically feasible, hard candy manufacturers have been reluctant to sustain the excessive expense of funding the cost of designing equipment adaptable to the processing of hard candy ingredients other than sucrose and natural corn syrup solids. This reluctance on the part of the hard candy manufacturers has been especially apparent in view of the large invention of standard processing equipment installed in the present manufacturing facilities.

Accordingly, and especially in view of the fact certain ingredients particularly suitable for the manufacture of hard candies have distinct attributes in that they exhibit physiological and metabolic advantages over sucrose and natural corn syrup solids, there has existed a need to develop and compound these ingredients into formulations which essentially exhibit physical behavior similar to that of the standard sucrose-corn syrup solid materials. There has been an especial need to develop formulations which, while having the advantageous low-fermentability factor not accorded to sucrose, exhibit viscosity, specific heats, and other physical properties very similar to those of sucrose-corn syrup solid mixtures over a wide latitude of concentrations and temperatures. This tailoring of admixture substitute ingredients as replacements for sucrose as a hard candy base is essential for successful commercial processing with the existing candy manufacturing equipment.

The hard candy formulation of this invention have, to a large extent, fulfilled the increasing requirement for low-fermentable ingredients having a nutritious caloric content and being adaptable for processing in standard, hard candy manufacturing equipment.

SUMMARY OF THE INVENTION

Briefly stated, this invention resides in the discovery of specific formulations comprising an aqueous solution of a modified starch hydrolysate, lactose, and sugar alcohols which, when blended within a relatively narrow range of proportional amounts, can be successfully processed with standard hard candy equipment to advantageously yield a hard candy base for the production of hard candy products containing substantially all low-fermentable ingredients and having a nutritious caloric content equivalent to the hard candies of the prior art composed of large quantities of fermentable sucrose and natural corn syrup solids.

It is, therefore, a principal object of the invention to provide a low-fermentability carbohydrate base suitable for commercial hard candy manufacturing.

It is an object of this invention to provide a low-fermentability carbohydrate base which is compatable with the usual flavoring and coloring ingredient employed in hard candy manufacture.

It is another object of this invention to provide a low fermentability carbohydrate containing base for hard candies which is compatable with non-caloric sweeteners to effect a combination which, when employed in hard candy production, will contribute to the finished product a sweetness level equivalent to that of sucrose admixed with corn syrup solids.

It is another object of this invention to provide a low fermentability carbohydrate-containing base for hard candies which is compatable with non-caloric sweeteners to effect a combination which, when employed in hard candy production will contribute to the finished product a sweetness level equivalent to that of sucrose admixed with corn syrup solids.

It is a principal feature of this invention to provide a composition of low-fermentability carbohydrate ingredients proportioned in amounts of individual components so as to exhibit physical properties of viscosity and solidification similar to that of sucrose admixed with corn syrup solids.

It is an important feature of this invention to provide a low-fermentability carbohydrate base for hard candy products which affords the finished product with a storage stability equivalent. and, in some respects superior, to that of hard candy products employing sucrose-corn syrup solids as the ingredients for their respective bases.

It is yet another important feature of this invention to provide a hard candy base which can be effectively and efficiently processed with standard candy manufacturing facilities, particularly with respect to cookers, coolers, pumps, agitation equipment, and associated process control instrumentation.

The foregoing and additional objects and features of this invention will become more fully apparent from the following detailed description of the composition of the low-fermentability carbohydrate containing base and the manner in which it is combined with flavor, color, and sweetening additives to effect a multiplicity of nutritious hard candy products having various visual and taste appeal characteristics.

DETAILED DESCRIPTION OF THE PREFERRED EMBODIMENTS

One of the simplest forms of processed confectionery is hard candy. Although, when compared with other forms of confectionery such as chocolate creams, nougats, etc., the ingredients of these candies are relatively few, the processing requirements for this type of candy, however, are detailed and exacting in order to produce acceptable finished products. This necessity for carefully controlled processing requirements is necessary because hard candies are made mainly from sugar and corn syrup solids which are cooked to a substantially moisture-free syrup and then carefully cooled and formed into individual pieces. These two ingredients form the major portion of the hard candy and act as a base for the incorporation of color and flavor components.

In order to prepare a satisfactory base material for shaping and otherwise forming the finished hard candy it is necessary to cook the aqueous admixture of sucrose (from cane or beet sugar) and corn syrup to a practically moisture-free syrup. Unless this exacting operation is performed skillfully an unsatisfactory product will result. If insufficiently cooked the base will not sustain a permanent shape and will not provide the desired hard brittle texture. If overheated, the base will darken and carbonize and may solidify in the processing equipment resulting in extensive and costly clean-up operations. Sucrose-corn syrup mixtures lend themselves to cooking operation and processing equipment which has been designed primarily for the proper heat treatment and transportation of these ingredients to effect satisfactory hard candy bases.

Although it is recognized by those skilled-in-the-art that substitutes for the sucrose-corn syrup solid base would have certain physiological advantages, such as not providing fermentable degradation products when consumed, they have, for the most part, not received commercial acceptance by the hard candy manufacturing industry. This is primarily due to the fact they cannot be effectively processed under the same conditions and with the same equipment as is employed for sucrose-corn syrup aqueous mixtures.

Within present knowledge, when individual ingredients have been suggested as substitutes for either the sucrose, the corn syrup or mixtures of both they apparently have been rejected as being unsuitable for use in commercial hard candy manufacture because they do not perform similarly to sucrose-corn syrup aqueous mixtures in the standard available equipment.

In essence, this invention resides in the discovery that certain ingredients, all having the attributes of exhibiting low-fermentability characteristics when used *in combination* exhibit physical properties similar to sucrose-corn syrup and can therefore be processed accordingly. Importantly, this combination of substitute ingredients is compatable with the usual flavor and color additives employed in hard candies and, therefore, in addition to having the important feature of substantially not degrading into fermentable material, the substitute ingredients of this invention will provide the base for excellent hard candy products equivalent to those manufactured with sucrose-corn syrup bases. Additionally, the sweetness level of the combination of hard candy base materials of this invention can be satisfactorily augmented with non-coloric, non-fermentable sweeper additives.

Specifically, it has been discovered that a combination of lactose, modified starch hydrolysate and certain sugar alcohols can be satisfactorily processed to form an excellent quality hard candy base.

Recognition is taken of the fact that each of these ingredients or similar chemical variations thereof has been individually proposed or otherwise suggested for application as a constituent in various kinds of comestibles.

The use of lactose as a carrier for artificial sweetener has been proposed by Peebles et al. (U.S. Pat. No. 3,014,803). However, within present knowledge, a major portion of all of the sucrose containing base for hard candies has never been commercially replaced with a lactose containing base primarily due to the difficulty during processing in preventing the lactose from prematurely crystallizing or solidifying in the cooking kettles or other processing equipment resulting in expensive spoiled batches of base material.

The recently issued patent of Conrad (U.S. Pat. No. 3,329,507) discloses the employment of low-fermentability starch hydrolysate ingredients for confectionery.

Starch hydrolysates, however, either of the low-fermentability type or containing fermentable precursors when solely employed as a complete or partial replacement for sucrose and/or corn syrup materially alters the viscosity of the hard candy base, especially near the end point of moisture removal during the "boiling down" operation and, in addition to causing processing difficulties when used exclusively, do not lend themselves to the production of the hard candy base with satisfactory forming characteristics.

Avera (U.S. Pat. No. 2,859,121) has suggested the use of sorbitol to exploit its hygroscopicity and texturizing features. In view of the very nature of the physical properties of sorbitol wherein it markedly differs from the physical properties of admixtures of sucrose and corn syrup solids it is apparent it would greatly affect the processing properties of a hard candy base if substituted for sucrose and/or corn syrup in appreciable amounts.

In contrast to the prior art the present invention comprehends a complete substitution of ingredients as a replacement for sucrose and corn syrup to effect an improved hard candy base wherein the disadvantages of the above discussed conventional materials are avoided in a novel manner.

The crux of the invention lies in the discovery of a combination of ingredients—lactose, modified starch hydrolysate, and sugar alcohols—wherein each ingredient cooperates with the others to effect a hard candy base mixture which can be processed in conventional hard candy manufacturing equipment with processing conditions substantially similar to those employed for sucrose-corn syrup and which may be incorporated with other enhancing ingredients to provide superior hard candies having low-fermentability features.

The limitations on the proportional amounts of each of the ingredients used in the hard cnady base combination of this invention are important to the successful employment of the resulting mixture and the production of satisfactorily acceptable finished confectionery.

It has been discovered that a hard candy base containing 20–45% lactose, 10–45% sugar-alcohol and 25–60% modified starch hydrolysate can be processed with commercial hard candy equipment with a facility equivalent to that of the usual sucrose-corn syrup mixtures. The viscosities and solidification temperature of aqueous solutions of mixtures of the above ingredients within the proportional range of individual components are well within requirements for effective operating plant operations of mixing, cooking, transfer (pumping), cooling and forming. In substantially all respects the above ingredients when employed in the stated range of weight proportion can be processed for the manufacture of a hard candy base equally as well as and, in some respects, superior to a sucrose-corn syrup mixture.

Ideally, and for the great majority of hard candy base applications, it is preferred to use synergetic mixtures of 25–40% lactose, 30–45% modified starch hydrolysate and 15–40% sugar alcohol.

For purposes of this invention, the term "hard candy base" means the sweet base which is the main ingredient (about 75–99% by weight) of the hard candy to which are added flavoring and coloring additives and, according to selected recipes, other organoleptic and visual enhancing components including nuts, fruits, chocolate, etc. Generally, in the sequence of manufacturing operation, these additives are incorporated into the base immediately prior to the cooling and forming (shaping) of the total mixture to fabricate the finished hard candy. Although the term "hard candy" is usually employed to denote such items of commerce as lemon drops, sour balls, lollypops, cough drops and similar hard, glossy products, for purposes of this invention, and in accordance with the recognized terminology employed by the candy manufacturers, the term "hard candy" encompasses such other sweet products as peanut brittle and coating for popcorn. The latter two items are prepared from a base which, at the termination of the cooking operation, has a higher percentage of water than the other typical hard candy products listed.

As previously stated, the hard candy base mixture of this invention preferably contains 25–40% lactose. This disaccharide occurs in at least two crystalline forms designated "alpha" and "beta." The two forms of lactose, although having different solubility and crystal formations, are equally suitable for purposes of this invention. This is so because the less soluble alpha form when dissolved in hot water is converted to the beta form and does not revert to the alpha form when the hard candy base is cooked to a low (about 1%) moisture content.

An essential feature of this invention is the discovery that certain low molecular weight sugar alcohols such as sorbitol and mannitol, when used in conjunction with a starch hydrolysate, modulate the crystallization and solidification characteristics of the lactose to the point where the combination performs very similar to that of sucrose as a hard candy base ingredient. In effect, the low molecular weight sugar alcohols reduce the tendency of the lactose (and thus the hard-candy base admixture) to crystallize or "grain" under low moisture conditions at the termination of boiling down and thereby a smooth, glasslike hard candy can be produced. Also, it has been discovered that other non-fermentable saccharides having less than 13 carbon atoms in their molecular structure, such as galactose may be employed in place of, or in conjunction with, the sugar alcohols to similarly reduce the tendency for lactose to crystallize or "grain" at low moisture conditions.

Although the action of the sugar alcohol and/or the low-fermentability saccharides having less than 13 carbon atoms on the lactose in the carbohydrate-containing low-fermentability admixture of this invention is not clearly understood, it is apparent the sugar alcohol functions to both prevent the lactose from crystallizing out during the cooking phase and also moderates the viscosity of the low moisture admixture to a value where it can be accommodated in the conventional hard candy cooking and forming equipment.

Either sorbitol, mannitol or a mixture of the two sugar alcohols is the preferred sugar alcohol component. However, in order to prevent excessive hygroscopicity in the low-fermentability candy product, it has been discovered that, for most applications, the sugar alcohol should contain at least 6% mannitol and it is preferable that mannitol make up at least 50% of the sugar alcohol mixture.

The third constituent in the hard-candy base of this invention comprises 25–60% of a modified starch hydrolysate. The term modified is employed to designate a starch hydrolysate having only a small amount of dextrose and maltose. In order not to detract from the low-fermentability feature of the hard candy base of the invention, the starch hydrolysate should preferably contain less than about 1% dextrose and less than about 5% maltose. Since these specifications are difficult to attain without sustaining the high expense of purification, modified starch hydrolysates containing up to about 5% dextrose and up to about 10% maltose, although having some fermentable sugar content, have been discovered to cooperate effectively with the lactose and sugar alcohol to effect the desired physical properties of the hard candy base. Prefermented corn syrup and hydrolyzed corn starch having a dextrose equivalent of less than 5% are representative of the modified starch hydrolysates suitable for purposes of the instant invention. As a practical matter, it has been found that the starch hydrolysate manufactured by the American Maize Co., New York, N.Y., designated "Frodex 15," and a starch hydrolysate made by The Grain Processing Co., Muscatine, Iowa, designated "Maltrin 15," maltodextrin type starch hydrolysates having less than 2% glucose (dextrose) are acceptable for purposes of this invention.

Since, as stated above, the hard candy base admixture of this invention will, as with a conventional sucrose-corn syrup hard-candy base, be the major constituent (about 75–99%) of the finished hard candy product it is apparent that the fermentable sugar content of the finished product will be extremely low compared to those of the prior art.

In most instances the hard candy base represents over 90% of the total weight of the product and the total ingredients, on a dry basis, represent less than 5% of fermentable carbohydrates.

In the description of this invention, a distinction is made between carbohydrates which are not fermentable and those which are fermentable. A non-fermentable carbohydrate is meant to mean one which is not *readily* fermented by baker's yeast, recognizing that virtually all sugars are fermentable by at least one organism. While it is desirable to eliminate all ingredients from hard candy which are readily fermentable with baker's yeast, as a practical matter, it has been discovered that hard candy may contain up to about 5% glucose and up to about 10% maltose, yet offer the advantages of low-fermentability. A low-fermentability hard candy is defined, for purposes of this invention, as one which meets the following tests:

A quantity of 1.25 grams of hard candy product is placed in a fermentation tube and in 25 ml. of a mixture of 32 grams of baker's yeast in 800 ml. of distilled water. A low-fermentability hard candy will form less than 10 ml. of gas ($CO_2$) when dissolved in such a mixture and held for one hour at 35° C.

Similarly, if one gram of the hard candy product is dissolved in 25 ml. of a mixture of 24 grams of baker's yeast in 75 ml. of distilled water and held for one hour at 35° C., the pH of the mixture will not be depressed below about 5.

Understandably, the hard candy base of this invention does not have the sweetness level of the usual sucrose-corn syrup hard candy base. This deficiency, however, is readily remedied by augmenting the hard candy base with a non-caloric sweetener. It has been found that either cyclamic acid or acid saccharin or the edible salts of these acids are compatible with the hard candy base admixture of the invention and can be employed to adjust the sweetness level of the base to a desired degree.

As with the sucrose-corn syrup hard candy base of the prior art, the unique candy base of this invention may be enhanced with a wide range of edible coloring and flavoring ingredients and with such other ingredients as nuts, fruit, chocolate, etc. Additionally, compatible medication ingredients can be incorporated with the candy base of the invention.

The invention will now be more fully described by reference to the following illustrative examples of hard candy bases and the finished confectionery products containing representative hard candy base formulations of the invention.

EXAMPLE I

Butterscotch hard candy

The following mixture was combined in an open cooking kettle, dissolved, and boiled with agitation to evaporate off moisture and attain a boiling temperature of 230° F.

Lactose: 100 lbs.
Sorbitol (70%)[1]: 100 lbs.
Starch hydrolysate[2]: 97 lbs.
Water: 75 lbs.
Calcium saccharin: 2.3 oz.
Calcium cyclamate: 4.7 oz.

[1] An aqueous solution containing 70% by weight of sugar alcohols.
[2] "Frodex 15"—American Maize Co., New York, N.Y.

The mixture was passed through a commercial continuous-type vacuum cooker where its moisture content was reduced to approximately 1%. Butterscotch flavoring and caramel coloring were then added to the substantially moisture-free molten mass and blended in a Berk's mixer. The enhanced base was then cooled and formed into lozenges. The hard candy base handled well and was processed without difficulty in the commercial candy equipment.

EXAMPLE II.—REPRESENTATIVE SWEETENED HARD CANDY BASE MIXTURES

|  | Formulation, parts by weight | | |
| --- | --- | --- | --- |
|  | A | B | C |
| Lactose | 56 | 83 | 83 |
| Frodex 15 [1] | 54 | 80 | 80 |
| Mannitol | 0 | 0 | 62 |
| Sorbitol (70%) | 59 | 87 | 0 |
| Water | 42 | 65 | 65 |
| Ca saccharin | .08 | 0.12 | 0.12 |
| Ca cyclamate | .16 | .24 | .24 |

[1] Starch hydrolysate containing less than 5% dextrose manufactured by American Maize Co., New York, N.Y.

In Example II each of the formulated mixtures was heated to 230° F. in a commercial kettle and then pumped through a continuous cooker. In the continuous cooker each of the formulations was subjected to a vacuum and heated sufficiently to remove water by boiling, which resulted in each cooked syrup base having about 1% moisture as it exited from the cooker. Subsequent to cooking, each of the candy base mixtures was poured onto a slab and was then flavored and colored in several varying manners. Each of the candy-base mixtures processed satisfactorily in the equipment and the resulting products were all very stable when hot and could readily be held for an hour without any problems arising. The various mixtures were readily formed into various shapes such as pillows, waffles, lollypops, kisses and lozenges, the latter being formed in a Hansella drop former.

EXAMPLE III.—RANGE OF UNSWEETENED HARD CANDY BASE MIXTURES
[Relative quantities by weight]

|  | Lactose | Frodex 15 | Sorbitol | Mannitol |
| --- | --- | --- | --- | --- |
| A | 115 | 110 | 0 | 65 |
| B | 125 | 110 | 0 | 55 |
| C | 115 | 110 | 0 | 75 |
| D | 115 | 100 | 0 | 85 |
| E | 105 | 120 | 0 | 75 |
| F | 130 | 115 | 0 | 55 |
| G | 115 | 110 | 85 | 0 |
| H | 115 | 110 | 70 | 15 |
| I | 105 | 120 | 85 | 0 |
| J | 115 | 110 | 75 | 0 |
| K | 120 | 105 | 75 | 0 |
| L | 130 | 95 | 75 | 0 |
| M | 100 | 100 | 100 | 0 |
| N | 100 | 125 | 75 | 0 |
| O | 115 | 125 | 60 | 0 |

The above tabulation is exemplary of differing proportions of the primary ingredients and as such represents typical quantities suitable for the preparation of hard candies within the scope of this invention. In each instance, artificial sweeteners were used and added near the end of the cooking cycle to make the candies more palatable. All of the admixtures were formed by adding water and cooking to 310° F. Thereafter the resultant products were poured onto a marble slab and cut into small pieces.

A comparison of the hard candy products showed that the mannitol and mannitol-sorbitol formulations produced candy which had little tendency to stick together and, in general, excellent shelf-life properties. The hard candy products with sorbitol as the sole sugar-alcohol, on the other hand, while not exhibiting such degree of desirable extensive shelf life characteristics, are relatively inexpensive to manufacture because of the lower cost of sorbitol compared to the cost of mannitol.

Also, a hard candy base formulated with mannitol may be composited with a sorbitol formulated base to form an outer layer to protect the more hygroscopic sorbitol formulated hard candy base as described in the following example.

EXAMPLE IV

Composited (multilayer) hard candy

Among the hard candy formed from the formulations listed in Example II was composite hard candy wherein material from batch C, which contained only mannitol as the sugar-alcohol was used to form a jacket or outer coating around materials from batches A and B. The composite product resulting therefrom was thus possessed of the improved shelf life characteristics that resulted from the use of mannitol with the lower cost advantages attendant the use of sorbitol thereof.

EXAMPLE V

Hard candy (prototype batch)

A small prototype batch of hard candy was prepared as follows:

(a) 115 grams of Frodex 15 were dissolved in 130 ml. of water and 110 grams of lactose added thereto.

(b) The mixture was heated until the starch hydrolysate and sugar were in solution and 75 grams of sorbitol were added and the boiling continued. (The proportions of the three basic ingredients of the hard candy base being in approximately the same proportions as in the successful plant scale run described in Example I.)

(c) At approximately 250° F., 500 mg. of artificial sweetener mixture (composed of 2 parts calcium cyclamate and 1 part of calcium saccharin were added to the mixture.

(d) The boiling was continued to 300° F. and the mixture was flavored and colored and poured onto a slab. It was then formed into suitable size pieces for eating.

EXAMPLE VI

Hard candy with galactose

In the formulation of Example V, 75 grams of galactose were substituted for the like quantity of sugar-alcohol. The batch processed similar to Example V and the resulting product was essentially similar to the Example V product in all respects except it appeared to possess better shelf life properties since it had little or no tendency to stick together after an extended period during which the pieces were in contact with each other.

EXAMPLE VII

Candy troche with antibacterial agent

To a batch of hard candy as in Example V, 200 mg. of the antibacterial agent, cetyl pyridinium chloride, was added and mixed just prior to pouring the molten mass onto the cooling slab. The cooled material was cut into small pieces and, in all respects, handled similar to that of Example V.

EXAMPLE VIII

Peanut brittle

To the non-nutritive sweetened hard candy base of Example V heated to 240° F. was added 163 grams of Spanish peanuts and the cooking continued to 290° F. Seven grams of butter were added and the mixture heated to 300° F. Three grams of potassium bicarbonate were added after removing the heat source, the mixture stirred and then poured onto the cooling slab. The product was of excellent quality.

EXAMPLE IX

Caramel corn

To the non-nutritive sweetened hard candy base of Example V heated to 290° F. was added a teaspoon of butter and the cooking continued to 295° F. The mixture was colored with caramel and flavored with about 1.5 ml. of artificial caramel flavoring and after uniformly mixed, was poured onto popcorn with stirring to coat the popcorn as evenly as possible to produce an excellent product.

Summarizing, a new and improved nutritious hard candy base has been discovered which has a carbohydrate-containing content exhibiting a low degree of fermentability and which can be processed with conventional hard candy equipment resulting in a base with substantially the same physical properties as that of the fermentable sucrose-corn syrup. The formulations of the invention maximize the functional capabilities of a select limited number of ingredients to cooperate with each other to substantially duplicate the physical properties of sucrose-corn syrup base ingredients, but without the detrimental fermentability characteristics.

While the foregoing has illustrated and described what is now contemplated to be the best mode of carrying out the invention, the formulations are, of course, subject to some modification without departing from the spirit and scope of the invention. Therefore, it is not desired to restrict the invention to the particular forms illustrated and described but to cover all modifications that may fall within the scope of the appended claims.

What is claimed as new and desired to be secured by Letters Patent is:

1. A hard candy product which comprises about 20–45% lactose, about 25–60% modified starch hydrolysate having a dextrose content of less than 5%, about 15–50% of at least one saccharide of low fermentability and having a molecular structure with less than 13 carbon atoms, and a minor proportion of flavor-enchancing ingredients.

2. A hard candy product as set forth in claim 1 wherein said saccharide of low fermentability is a monosaccharide selected from the group consisting of sorbitol, mannitol and galactose.

3. A hard candy product as set forth in claim 1 wherein said modified starch hydrolysate is a prefermented corn syrup.

4. A hard candy product as set forth in claim 1 wherein said modified starch hydrolysate is a hydrolyzed corn starch.

5. A hard candy product as set forth in claim 1 to which there has been added at least one compatible medication ingredient.

6. The method of manufacturing a low fermentability hard candy base comprising heat processing an aqueous admixture of about 25–60% of a modified starch hydrolysate having a dextrose content of less than 5% (dry basis), 20–45% lactose and 10–45% of a sugar alcohol to a substantially moisture free condition.

7. The method of claim 6 wherein the sugar alcohol is selected from the group consisting of sorbitol, mannitol and mixtures thereof.

8. The method of claim 6 wherein the sugar alcohol is sorbitol.

9. The method of claim 6 wherein the sugar alcohol mixture contains equal parts by weight of sorbitol and mannitol.

10. The method of claim 6 wherein the sugar alcohol mixture contains at least 6% by weight of mannitol.

11. The method of manufacturing a low fermentability hard candy comprising admixing the hard candy base of claim 6 with flavoring, coloring and sweetening additives, cooling and forming the cooled mass into individual shaped hard candies.

12. The method of manufacturing low fermentability hard candy comprising;
    (a) blending an aqueous solution of about 25–60% of a starch hydrolysate having a dextrose content less than 5% (dry basis), 20–45% lactose and 10–45% of a sugar alcohol,
    (b) concentrating said aqueous solution to a syrup containing about 1% moisture,
    (c) admixing flavoring, coloring and sweetening additives with said syrup, so as to enhance the flavor and visual appeal, and
    (d) forming said enhanced syrup into individual hard candy finished product portions.

13. The method of claim 12 wherein the aqueous solution is concentrated to a syrup containing about 1% moisture by the application of heat prior to the addition of the flavoring, coloring and sweetening additives.

14. The method of claim 13 wherein the syrup is cooled prior to forming into individual hard candy finished product portions.

References Cited

UNITED STATES PATENTS

| | | | |
|---|---|---|---|
| 2,876,106 | 3/1959 | Jucaitis et al. | 99—141 |
| 3,125,491 | 3/1964 | Elowe et al. | 99—141X |
| 3,329,507 | 7/1967 | Conrad | 99—141 |
| 3,332,783 | 7/1967 | Frey | 99—134 |

FOREIGN PATENTS

| | | | |
|---|---|---|---|
| 3,814,375 | 8/1963 | Japan | 99—141 |

OTHER REFERENCES

Nizel, Nutrition in Clinical Dentistry, W. B. Saunders Co., 1960, pp. 38–39, 323.

JOSEPH M. GOLIAN, Primary Examiner

U.S. Cl. X.R.

424—361; 99—141